United States Patent [19]

Nakagawa

[11] Patent Number: 4,977,512
[45] Date of Patent: Dec. 11, 1990

[54] THREE DIMENSIONAL SIMULTANEOUS MACHINING AND MEASURING SYSTEM

[75] Inventor: Ryoji Nakagawa, Kanazawa, Japan

[73] Assignee: Shibuya Kogyo Co., Ltd., Ishikawa, Japan

[21] Appl. No.: 519,270

[22] Filed: May 4, 1990

Related U.S. Application Data

[63] Continuation of Ser. No. 184,354, Apr. 21, 1988, abandoned.

[51] Int. Cl.$^5$ .................... G05B 23/02; G05B 19/42
[52] U.S. Cl. .................... 364/474.37; 219/121.82; 318/578; 364/474.03; 364/474.08; 364/551.02
[58] Field of Search ............ 364/474.05, 474.08, 364/474.37, 474.03, 551.02, 513, 559, 191–193; 318/577, 578; 901/9, 46, 47; 219/124.34, 124.33, 121.63, 121.64, 121.67, 121.82, 121.83, 121.85

[56] References Cited

U.S. PATENT DOCUMENTS

| | | | |
|---|---|---|---|
| 4,001,556 | 1/1977 | Folchi et al. | 364/513 |
| 4,373,804 | 2/1983 | Pryor et al. | 356/1 |
| 4,469,930 | 4/1984 | Takahashi | 364/474.08 |
| 4,558,977 | 12/1985 | Inoue et al. | 364/474.05 |
| 4,604,574 | 8/1986 | Poluszny et al. | 364/474.37 |
| 4,626,999 | 12/1986 | Bannister | 364/474.08 |
| 4,653,011 | 3/1987 | Iwano | 364/513 |
| 4,659,902 | 4/1987 | Swensrud et al. | 219/121 LU |
| 4,665,493 | 5/1987 | Hattori | 364/474.37 |
| 4,676,002 | 6/1987 | Slocum | 901/9 |

FOREIGN PATENT DOCUMENTS

| | | |
|---|---|---|
| 100808 | 10/1984 | Japan . |
| 100809 | 10/1984 | Japan . |
| WO88/00327 | 1/1988 | PCT Int'l Appl. . |

OTHER PUBLICATIONS

Color catalog (two-fold, three leaf) bearing the identification Mitutoyo MX, Catalog No. 4069.
Brochure bearing the identification "Renishaw Leading the World in Touch Trigger Probe Technology".

*Primary Examiner*—Joseph Ruggiero
*Attorney, Agent, or Firm*—Flynn, Thiel, Boutell & Tanis

[57] ABSTRACT

A three dimensional machining system includes a three dimensional measuring unit which is separate from a three dimensional machine which actually applies a machining operation upon a three dimensional object. In this manner, a teaching operation with respect to an object to be machined can be performed during the machining operation by the three dimensional machine, thus improving the working efficiency of the three dimensional machine.

4 Claims, 2 Drawing Sheets

THREE DIMENSIONAL SIMULTANEOUS MACHINING AND MEASURING SYSTEM

This application is a continuation of U.S. Ser. No. 184,354, filed Apr. 21, 1988, now abandoned.

FIELD OF THE INVENTION

The invention relates to a three dimensional machining system which applies a three dimensional laser machining or welding operation to a three dimensional object.

DESCRIPTION OF THE PRIOR ART

In a conventional 5-axes laser machine or robotic laser machine, a machining head which irradiates laser radiation operates to machine a three dimensional object. However, a teaching operation is necessary beforehand which enables the machining head to function in a required manner.

Generally, a teaching operation includes drawing a cutting line and a point or points to be measured on an object which is to be machined, and then loading the object on the table of a laser machine so that the machining head be disposed in abutment against the required point or points. Determining the position and the angular orientation of the machining head provides an entry of positional data of the required point in three dimensional space and data representing the angular orientation of the machining head at such point.

This operation is repeated for each point to be measured, and such data is combined with the coverage of irradiation by the laser and the speed of movement of the machining head as well as other parameters which are required in the intended machining operation to allow calculating means, such as a microcomputer, which is used to control the operation of the laser machine, to derive operation control data, which is then used to control the machining head.

Such operation control data is utilized to operate the machining head without accompanying an irradiation of the laser radiation to see if the intended operation takes place in a normal manner. If any inappropriate operation occurs during the entire operation of the machining head, it is amended by repeating the entry of data concerning the required points and the following calculations to determine final operation control data.

When the teaching operation is completed in this manner, an object to be cut is loaded on the machining table, and the machining head is operated in accordance with the operation control data mentioned above, thus applying a laser machining operation to the object.

It will be seen from the foregoing that the prior art practice has been to utilize the machining head of a laser machine to perform a teaching operation. During such interval, no actual laser machining operation is enabled, thus resulting in a degraded working efficiency of the laser machine.

SUMMARY OF THE INVENTION

In view of the foregoing, it is an object of the invention to provide a three dimensional machining system including a three dimensional measuring unit which is separate from a three dimensional machine such as a laser machine and which enables a teaching operation to be performed.

Thus a three dimensional machining system according to the invention comprises a three dimensional measuring unit which permits an entry of positional data of a given point on an object in three dimensional space as well as data representing the angular orientation of a machining head of the three dimensional machine at such point, calculating means for calculating operation control data to be used with the machining head on the basis of data which is entered from the measuring unit, and a three dimensional machine for controlling the machining head in accordance with operation control data to allow the machining head to apply a three dimensional machining operation to the object, the three dimensional measuring unit and the three dimensional machine being independently operable.

With this arrangement, it is possible to accomplish a teaching operation for a machining operation which is planned to be performed next, by the three dimensional measuring unit during the time the three dimensional machine is actually applying a machining operation, thereby improving the working efficiency of the three dimensional machine.

Above and other objects, features and advantages of the invention will become apparent from the following description of an embodiment thereof with reference to the drawings.

DETAILED DESCRIPTION OF EMBODIMENT

Figure 1:
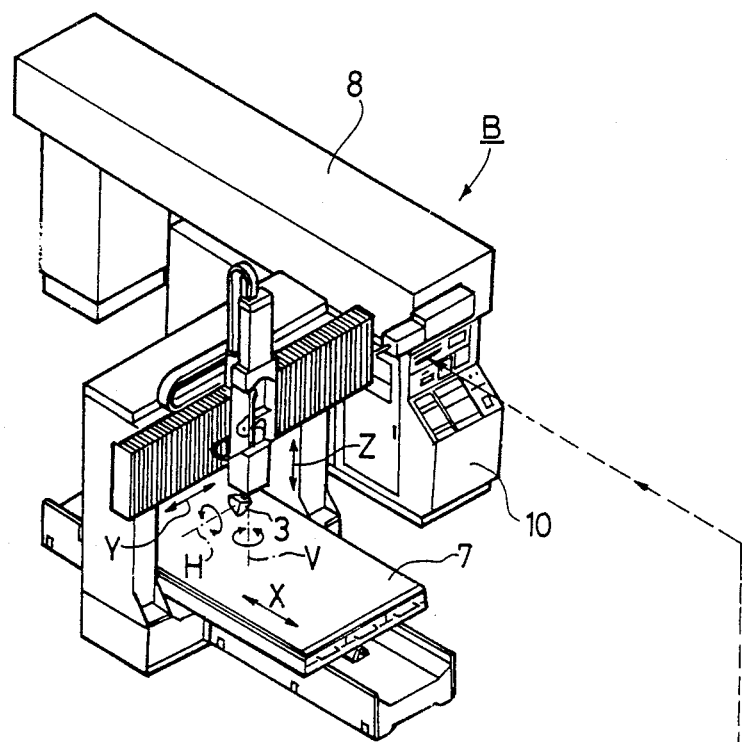
FIG. 1 is a schematic perspective view of one embodiment of the invention.
Figure 1:
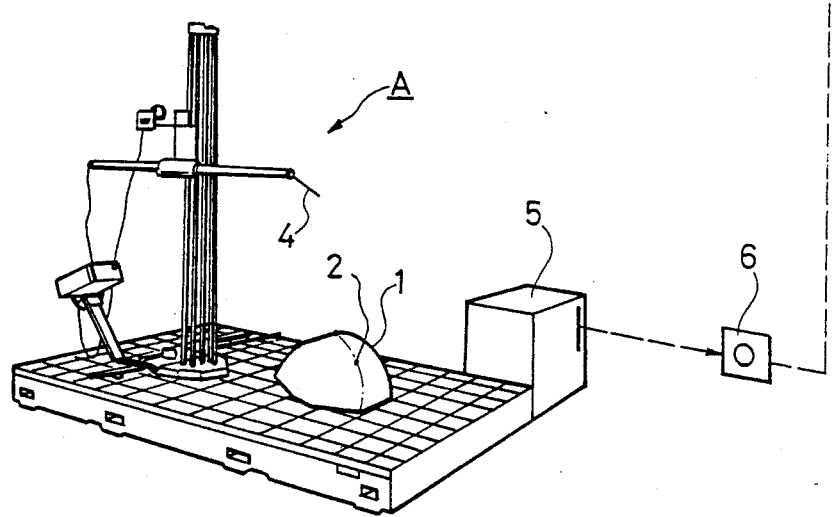

Referring to the drawings, FIG. 1 shows a conventional three dimensional measuring unit A and a conventional three dimensional laser machine. Any three dimensional measuring unit may be utilized for the unit A which is capable of determining positional data of a given point 2 on an object 1 which is to be machined in three dimensional space as well as data representing the angular orientation of a machining head 3 of the laser machine B at such point.

A three dimensional measuring unit of a first kind may include a probe 4, which is brought into contact with the point 2 on the object 1 while setting the probe 4 at an optimal angle of inclination, thus simultaneously deriving positional data of the point 2 in the three dimensional space as well as the angle of inclination of the probe 4 or data representing the angular orientation of the machining head 3 of the laser machine B which is assumed at the point 2.

A three dimensional measuring unit of a second type may also include a probe 4, which is brought into contact with the point 2 on the object 1. In this manner, the entry of only positional data of the point 2 in the three dimensional space is enabled. In this arrangement, the probe 4 may be utilized to derive positional data of three points, for example, which are located around and in the vicinity of the point 2 in a sequential manner. Positional data of these three points may be utilized to define a plane, or alternatively the positional data of the three points in combination with the positional data of the point 2 may be utilized to define a spherical plane. The angular orientation of a normal to such plane or spherical plane may be delivered as data representing the angular orientation of the machining head 3.

In a modification of the three dimensional measuring unit of the second type, a suitable sensor may be provided in addition to the probe 4 so that positional data of points located around the point 2 may be simultaneously obtained from the sensor when the probe 4 determines the positional data of the point 2 when it is brought into contact therewith.

A three dimensional measuring unit of a third kind includes a probe 4 which is caused to move back and forth along the surface of the object 1 so that a stereographic configuration of the entire object 1 may be scanned to produce data for entry. In this instance, the probe 4 may be brought into contact with the point 2 to derive positional data thereof. Alternatively, an entry of the positional data of the point 2 may take place through entry means such as keyboard. Thereupon, the direction of the normal to the object at the point 2 may be calculated from the stereographic configuration of the entire object 1. This direction of the normal may be utilized as data representing the angular orientation of the machining head 3.

By the same token, the stereographic configuration of the entire object 1 may be obtained from numerical control data which is obtained when manufacturing a metal mold since a die is conventionally manufactured on the basis of numerical control data which represents the configuration of the internal surface of a metal mold. If a metal mold which is used to manufacture the object 1 to be machined is already associated with such numerical control data, data representing the stereographic configuration of the object 1 may be derived from such numerical control data since data representing the configuration of the internal surface of the metal mold is in substantial coincidence with the configuration of the external surface of the object 1.

The three dimensional measuring unit A may utilize any of the kinds described above, and is not limited thereto. As mentioned, any measuring unit may be used which is capable of deriving the positional data of point 2 on the object 1 to be machined in the three dimensional space as well as data representing the angular orientation of the machining head 3 of the laser machine B at such point.

When the positional data and data representing the angular orientation at the point 2 are derived by the three dimensional measuring unit A, any additional data such as the presence or absence of irradiation of laser radiation or the speed of movement of the machining head 3 may be entered as required. The teaching operation mentioned above is repeated for a number of points located on the object 1 which are required to perform an intended machining operation. Calculating means 5 such as a microcomputer which is used to control the three dimensional measuring unit A is used to calculate operation control data which is used in controlling the machining head 3 of the laser machine B on the basis of data mentioned above. The result of calculation is recorded in a record medium 6 such as a disk or tape.

Any laser machine which is capable of performing a three dimensional laser machining operation upon the object 1 may be used as the laser machine B. In the example shown, the laser machine B is constructed as 5-axes laser machine. As shown, the machining head 3 is rotatable about both a horizontal axis H and a vertical axis V and is also translatable in the vertical or Z-axis direction and in the direction of Y-axis in the horizontal plane. The object 1 may be loaded upon a machining table 7 which is translatable in the direction of X-axis, which is perpendicular to the Y-axis in the horizontal plane. In this manner, the tip of the machining head 3 may be brought into opposing relationship with the object 1 at any desired position and at a required angular orientation relative thereto.

Figure 2:
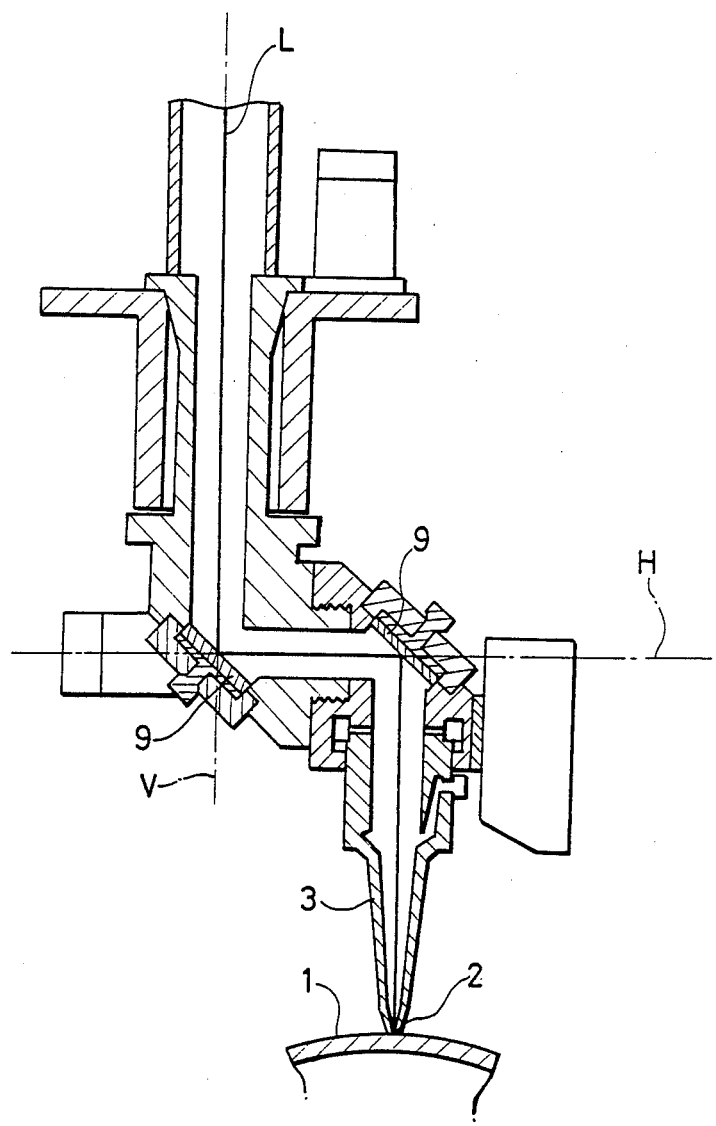
FIG. 2 is a cross section of part of the arrangement shown in FIG. 1.

The laser machine B includes a laser oscillator 8, emitting laser radiation L, which is directed by suitably located reflecting mirrors 9 (FIG. 2) to the machining head 3, and thence irradiated toward the object 1.

The laser machine B also includes calculating means 10 such as a microcomputer, which is operative to receive operation control data derived by the three dimensional measuring unit A from a record medium 6, to control the machining head 3 in accordance with such operation control data, thus applying a three dimensional laser operation upon the object 1.

When the operation control data is fed from the record medium 6 to the laser machine B, the object 1 is loaded upon the table 7, and the tip of the machining head 3 is brought into contact with one or more points 2 on the object 1 to derive the positional data thereof, allowing the calculating means 10 to bring the coordinates contained in the operation control data into coincidence with the actual coordinates of the object 1 on the machining table 7.

Subsequently, the machining head 3 is operated in accordance with the operation control data without accompanying an irradiation of the laser radiation L to see if the operation occurs in a normal manner. Any inappropriate operation which may occur with the machining head 3 is amended by repeating the entry of required points and resulting calculation again to derive final operation control data. It is to be noted that a large difference in the size between the probe 4 and the machining head 3 may cause an interference of the machining head 3 with respect to the object 1. In this instance, it is necessary to change data representing the angular orientation of the machining head 3.

After the final operation control data is obtained in this manner, the machining head 3 may be operated in accordance with such data to apply a laser machinining operation upon the object 1. It will be apparent that during the time a machining operation is being executed by the laser machine B, the three dimensional measuring unit A may be used to perform a teaching operation upon a next object to be machined.

In the described embodiment, data from the three dimensional measuring unit A is fed to the calculating means 10 of the laser machine B through the record medium 6. However, the calculating means 5 in the three dimensional measuring unit A and the calculating means 10 in the laser machine B may be interconnected through a signal cable to enable a direct data transfer therebetween.

Alternatively, the both calculating means 5 and 10 may be combined together to control both the three dimensional measuring unit A and the laser machine B with a single calculating means provided the latter has an advanced capability. This suggests that what is required is the execution of the described control by the combination of both calculating means 5 and 10. For example, the calculating means 10 located within the laser machine B may calculate operation control data based on various data supplied from the three dimensional measuring unit A. It will also be noted that when calculating the operation control data, such data may be derived so as to avoid interference of the machining head 3 with the object 1 by taking the size of the head 3 into consideration.

While the invention has been described above in connection with an embodiment thereof, it should be understood that various changes, substitutions and modifications will readily occur to one skilled in the art without departing from the spirit and scope of the invention defined by the appended claims.

What is claimed is:

1. An apparatus for efficiently machining a plurality of workpieces, comprising:

measuring means for deriving three dimensional positional data and angular orientation data for each of a plurality of points on a first said workpiece;

machining means for performing a three dimensional machining operation on said first workpiece in response to said positional and angular orientation data; and means for effecting operation of said machining means on said first workpiece simultaneously with derivation by said measuring means of additional positional and angular orientation data corresponding to a second said workpiece, including a signal cable connected between said measuring means and said machining means to provide direct transfer of said positional and angular orientation data from said measuring means to said machining means, and a pair of separate support platforms respectively associated with said machining means and said measuring means for respectively supporting said first and second workpieces during said simultaneous operation of said machining means and said measuring means.

2. A method for efficient machining of a plurality of workpieces, comprising the steps of:

providing measuring means for deriving three dimensional positional data and angular orientation data for each of a plurality of points on a respective said workpiece, said measuring means including a first support platform for supporting said workpiece;

providing machining means separately from said measuring means for performing a three dimensional machining operation on a respective said workpiece in response to the corresponding said positional and angular orientation data, said machining means including a second support platform which is separate from said first support platform for supporting said workpiece on said machining means;

using said measuring means to derive said positional and angular orientation data corresponding to a first said workpiece; and thereafter using said machining means to three dimensionally machine said first workpiece on said second support platform in response to the corresponding said positional and angular orientation data, while simultaneously using said measuring means to derive positional and angular orientation data corresponding to a second said workpiece which is supported on said first support platform.

3. The method according to claim 2, wherein said machining means includes a laser machining head, and wherein said machining step includes the step of using said laser head to machine said first workpiece.

4. An apparatus for efficiently machining a plurality of workpieces, comprising:

measuring means for deriving three dimensional positional data and angular orientation data for each of a plurality of points on a first said workpiece;

machining means for performing a three dimensional machining operation on said first workpiece in response to said positional and angular orientation data;

means for effecting operation of said machining means on said first workpiece simultaneously with derivation by said measuring means of additional positional and angular orientation data corresponding to a second said workpiece, including a pair of separate support platforms respectively associated with said machining means and said measuring means for respectively supporting said first and second workpieces during said simultaneous operation of said machining means and said measuring means;

said machining means including a laser machining head supported for rotation about respective horizontal and vertical axes of rotation and supported for both vertical and horizontal reciprocal movement, and having means defining a laser beam passageway therethrough, said passageway having a first section which is substantially vertically aligned with said vertical axis of rotation, a second section adjoining said first section and substantially horizontally aligned with said horizontal axis of rotation, and a third section adjoining said second section at a location spaced from said first section, said third section extending generally parallel to said first section, said laser machining head further including first and second mirrors located in said laser beam passageway where said second section adjoins said first and third sections, respectively, said first mirror being positioned to face both said first and second sections, said second mirror being positioned to face both said second and third sections, said mirrors being arranged substantially parallel to each other, said mirrors facing substantially toward each other from opposite ends of said second section, said laser machining head being positioned above said support platform of said machining means, said support platform being supported for reciprocal horizontal movement transversely to the direction of horizontal movement of said laser machining head; and said measuring means including a probe which is supported above said support platform thereof for three dimensional movement relative to said support platform.

* * * * *